US 12,246,785 B2

(12) United States Patent
Yasuda et al.

(10) Patent No.: US 12,246,785 B2
(45) Date of Patent: Mar. 11, 2025

(54) AUTOMATED STEERING SYSTEM DURING LOSS OF TRACTION

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US); Yan Ming Jonathan Goh, Palo Alto, CA (US)

(73) Assignees: Toyota Research Institute, Inc., Los Altos, CA (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 233 days.

(21) Appl. No.: 18/100,750

(22) Filed: Jan. 24, 2023

(65) Prior Publication Data
US 2024/0083497 A1    Mar. 14, 2024

Related U.S. Application Data (60) Provisional application No. 63/406,539, filed on Sep. 14, 2022.

(51) Int. Cl.
*B62D 6/00* (2006.01)
*B62D 15/02* (2006.01)

(52) U.S. Cl.
CPC ............. *B62D 6/003* (2013.01); *B62D 6/005* (2013.01); *B62D 15/025* (2013.01)

(58) Field of Classification Search
CPC ....... B62D 6/003; B62D 6/005; B62D 15/025
USPC ............................ 701/41, 42, 43, 44, 71, 82
See application file for complete search history.

(56) References Cited

U.S. PATENT DOCUMENTS

| | | | |
|---|---|---|---|
| 7,997,373 B2 | 8/2011 | Yasui et al. | |
| 9,873,452 B2 | 1/2018 | Kim et al. | |
| 10,252,722 B2 | 4/2019 | Hwang et al. | |
| 10,759,282 B2 | 9/2020 | Suzuki | |
| 10,787,199 B2 | 9/2020 | Kim et al. | |
| 11,148,665 B2 | 10/2021 | Takahashi et al. | |
| 11,318,962 B2 | 5/2022 | Safour et al. | |
| 2017/0029018 A1 | 2/2017 | Lubisher et al. | |
| 2017/0174257 A1 | 6/2017 | During et al. | |

(Continued)

FOREIGN PATENT DOCUMENTS

| | | | | |
|---|---|---|---|---|
| DE | 102017220158 A1 | | 5/2019 | |
| JP | 2000503611 | * | 3/2000 | ................ B60T 8/24 |

(Continued)

*Primary Examiner* — Hai H Huynh
(74) *Attorney, Agent, or Firm* — Christopher G. Darrow; Darrow Mustafa PC (57) ABSTRACT

System, methods, and other embodiments described herein relate to steering a vehicle based during loss of traction. In one arrangement, a method for steering a vehicle during loss of traction is disclosed. The method includes, responsive to detecting a slipping tire of a vehicle losing traction with a road, automatically steering the vehicle separately from an input of a steering wheel of the vehicle to cause the vehicle to follow a path. The method also includes decoupling control of a pair of front tires of the vehicle by the steering wheel. The method further includes rotating, independently of an input to the steering wheel and in parallel with steering the vehicle, the steering wheel to match an actual yaw of the vehicle.

20 Claims, 6 Drawing Sheets

(56) References Cited

U.S. PATENT DOCUMENTS

2018/0273086 A1 9/2018 Jung
2020/0406964 A1 12/2020 Hulten et al.
2022/0055650 A1 2/2022 Lee

FOREIGN PATENT DOCUMENTS

JP 3758352 * 3/2006 ................ B60T 8/17
JP 2009113729 A 5/2009

* cited by examiner

AUTOMATED STEERING SYSTEM DURING LOSS OF TRACTION

CROSS-REFERENCE TO RELATED APPLICATIONS

This application claims the benefit of U.S. Provisional Application No. 63/406,539, filed on Sep. 14, 2022, which is incorporated herein by reference in its entirety.

TECHNICAL FIELD

The subject matter described herein relates, in general, to systems and methods for automatically steering a vehicle during loss of traction and, more specifically, to systems and methods for automatically operating a steering system to take control of the steering of a vehicle during loss of traction and to improve the understanding of a driver of the vehicle of the direction in which the steering system is steering the vehicle.

BACKGROUND

When driving a vehicle, a driver has a "mental model" that relates the angle of the steering wheel, the angle of the front tires, and the yaw. For example, when the driver rotates the steering wheel clockwise, the driver expects the front tires to turn to the right and the vehicle to turn to the right (a clockwise yaw). Under the mental model of the driver, the steering wheel angle, the front tire angles, and the yaw are all proportional. However, there may be instances during driving in which the behavior of the vehicle does not follow the driver's mental model. These instances may occur when a tire of the vehicle loses traction with the road (e.g., when the vehicle is skidding, sliding, or drifting), and when oversteering, understeering, and/or countersteering may be employed to stabilize the vehicle. For example, when a vehicle is drifting and turning to the left, a driver may need to non-intuitively rotate the steering wheel in the direction opposite the turn (i.e., clockwise), thus pointing the tires also in the direction opposite the turn (i.e., to the right). In such conditions, the steering wheel angle and the tire angles are not proportional to the yaw, and thus, unless the driver is a professionally trained or otherwise highly skilled and understands oversteering, understeering, and countersteering, the behavior of the vehicle will not follow the mental model of the driver. This may cause a normally skilled driver to not know how to properly maneuver the vehicle when loss of traction occurs.

SUMMARY

In one embodiment, example systems and methods relate to a manner of automatically controlling, independently of an input to a steering wheel, the steering of a vehicle when loss of traction occurs, while rotating the steering wheel according to a direction intuitive to the driver so that the driver understands the direction in which the vehicle is traveling and being steered. As previously noted, when loss of traction occurs, the steering wheel angle, the tire angles, and the yaw of the vehicle may not be proportional when understeering, or oversteering the vehicle may be needed, and thus, the behavior of the vehicle does not follow intuition of the driver. These instances of loss of traction can thus cause dangerous situations in which the driver does not know how to control the vehicle.

Therefore, in one embodiment, a system automatically controls steering of a vehicle independently of a driver input to the steering wheel to stabilize the vehicle when loss of traction occurs. In one aspect, the system detects a tire of the vehicle losing traction with the road. For example, sensors of a vehicle, such as a traction sensor, collect data, and the system can monitor the tires of the vehicle and, in the event of loss of traction between one of the tires and the road, the system can detect loss of traction of the tire based on the sensor data. The system, in one approach, steers the vehicle separately from the driver input to counteract the detected condition and cause the vehicle to follow a path. In some instances, the path is a safe area of travel and/or a path following the road upon which the vehicle is traveling. In order to cause the vehicle to follow the path, the system can detect the boundaries of the safe area of travel and/or the road using environment sensors, GPS and/or map data, cameras, etc. As the system steers the vehicle, the system, in one or more arrangements, also rotates the steering wheel to match an actual yaw of the vehicle, which may not align with a direction of the wheels/tires. For example, when the system steers the vehicle to the right by rotating the tires to the right, the system may rotate the steering wheel clockwise independently of the rotation of the tires. In another example, when the system steers the vehicle to the left by rotating the tires to the left, the system may rotate the steering wheel counterclockwise independently of the rotation of the tires. In this way, when the steering wheel rotates according to the actual yaw of the vehicle, the disclosed system improves the understanding of the driver of the direction in which the vehicle is traveling, even if the angle of the tires is not proportional to the actual yaw of the vehicle.

In one embodiment, a system is disclosed. The system includes a processor and a memory communicably coupled to the processor. The memory stores instructions that when executed by the processor cause the processor to, in response to detecting a slipping tire of a vehicle losing traction with a road, steer the vehicle separately from an input of a steering wheel of the vehicle to cause the vehicle to follow a path. The instructions also cause the processor to decouple control of a pair of front tires of the vehicle by the steering wheel. The instructions further cause the processor to rotate, independently of an input to the steering wheel and in parallel with steering the vehicle, the steering wheel to match an actual yaw of the vehicle.

In one embodiment, a non-transitory computer-readable medium is disclosed. The non-transitory computer-readable medium includes instructions that, when executed by a processor, cause the processor to, in response to detecting a slipping tire of a vehicle losing traction with a road, steer the vehicle separately from an input of a steering wheel of the vehicle to cause the vehicle to follow a path. The instructions also cause the processor to decouple control of a pair of front tires of the vehicle by the steering wheel. The instructions further cause the processor to rotate, independently of an input to the steering wheel and in parallel with steering the vehicle, the steering wheel to match an actual yaw of the vehicle.

In one embodiment, a method is disclosed. The method includes, responsive to detecting a slipping tire of a vehicle losing traction with a road, steering the vehicle separately from an input of the steering wheel of the vehicle to cause the vehicle to follow a path. The method also includes decoupling control of a pair of front tires of the vehicle by the steering wheel. The method also includes rotating, independently of an input to the steering wheel and in parallel with steering the vehicle, the steering wheel to match an actual yaw of the vehicle.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a steering system for a vehicle aimed at improving the understanding of a driver about operations of the steering system. The steering system can detect the vehicle losing traction with a road and automatically steer the vehicle separately from an input of a steering wheel to cause a corrective maneuver. In parallel with steering the vehicle, the steering system can rotate the steering wheel independently from the wheels to match an actual yaw of the vehicle so that the driver intuitively understands the direction in which the steering system is steering the vehicle.

Figure 1:
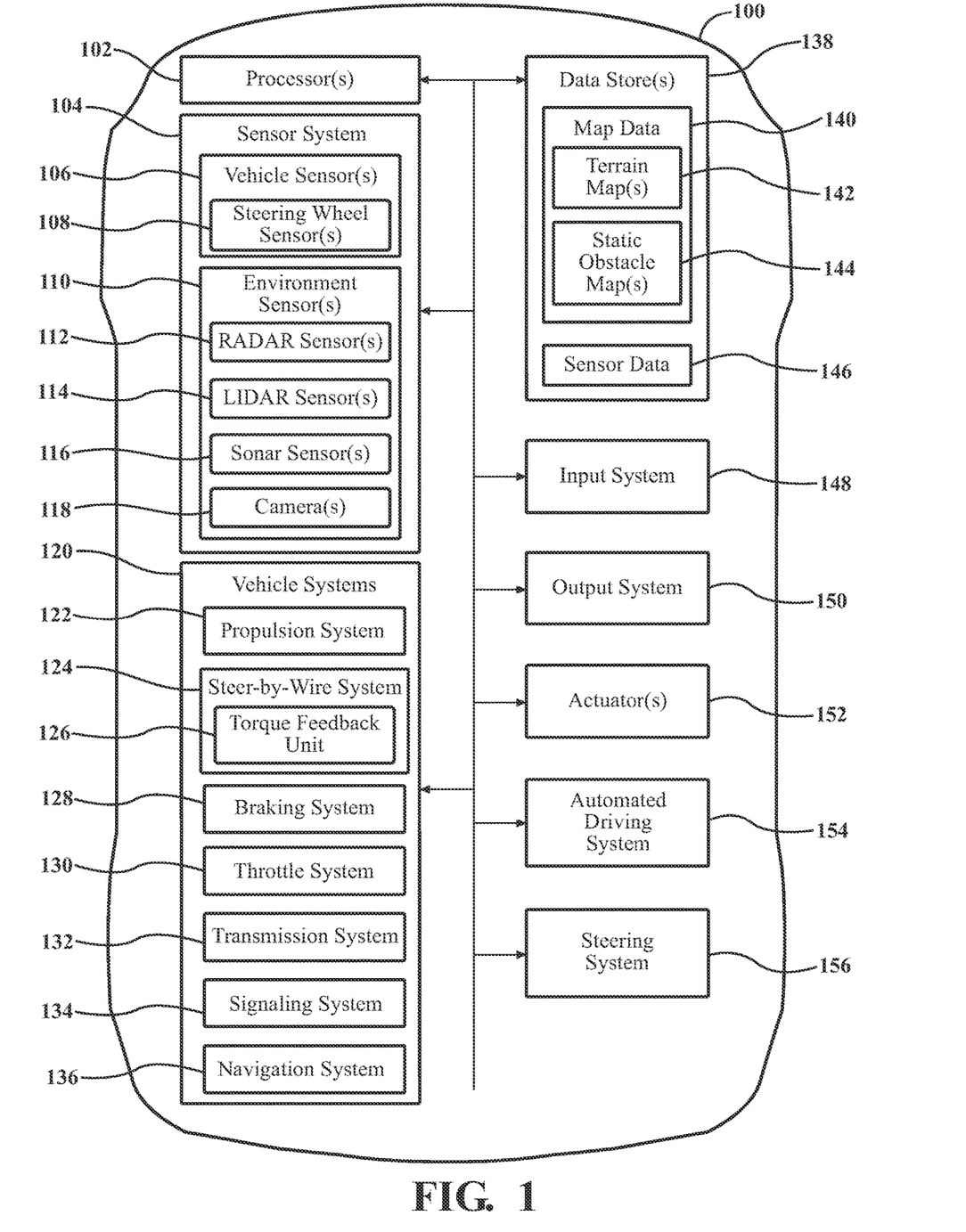
FIG. 1 illustrates one embodiment of a vehicle having a steering system.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated systems, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In any case, the vehicle 100 also includes a steering system 156. The steering system 156 may be incorporated within the automated driving system 154 or may be separate as shown. The steering system 156 may detect the vehicle losing traction with a road and steer the vehicle to cause the vehicle to regain traction.

Figure 2:
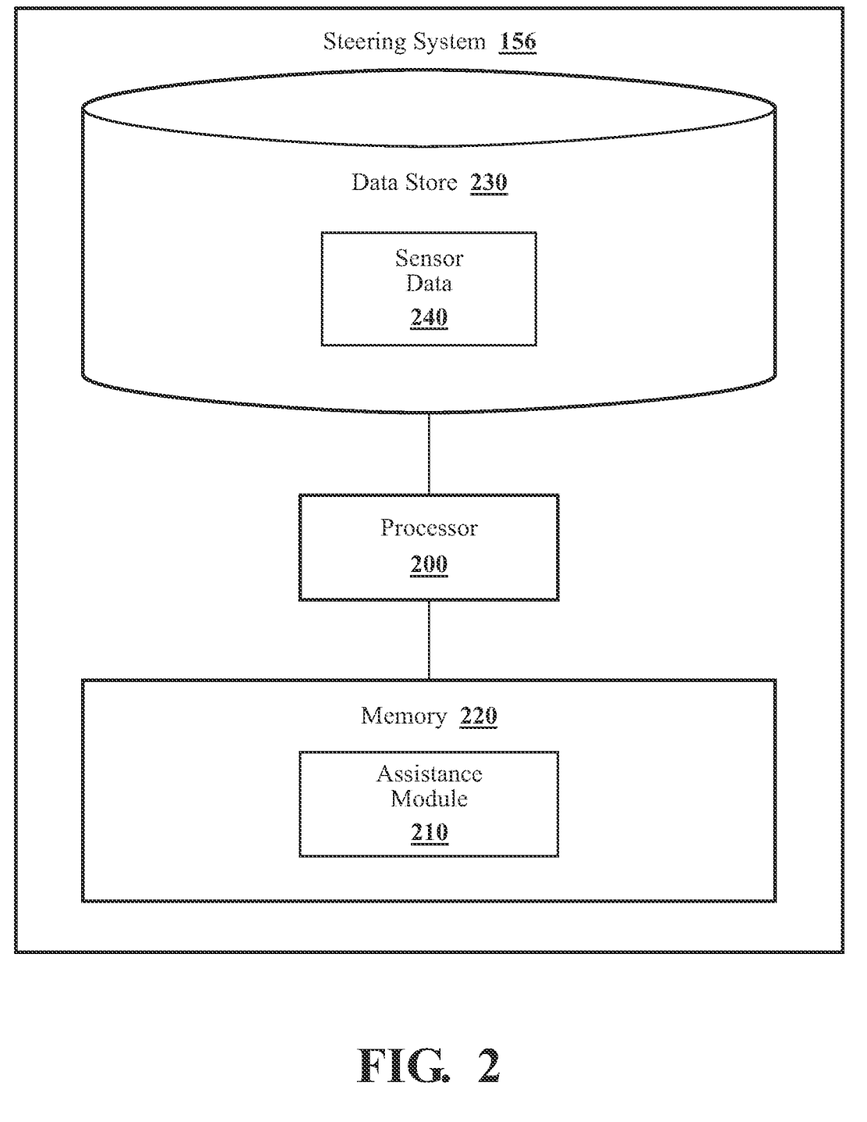
FIG. 2 illustrates an example of the steering system.

With reference to FIG. 2, one embodiment of the steering system 156 is illustrated. As shown, the steering system 156 includes a processor 200. Accordingly, the processor 200 may be a part of the steering system 156 or the steering system 156 may access the processor 200 through a data bus or another communication path. In one or more embodiments, the processor 200 is an application specific integrated circuit that is configured to implement functions associated with an assistance module 210 of the steering system 156. In general, the processor 200 is an electronic processor such as a microprocessor that is capable of performing various functions as described herein. In one embodiment, the steering system 156 includes a memory 220 that stores the assistance module 210. The memory 220 is a random-access memory (RAM), read-only memory (ROM), a hard disk drive, a flash memory, or other suitable memory for storing the assistance module 210. The assistance module 210 can include, for example, computer-readable instructions that, when executed by the processor 200, cause the processor 200 to perform the various functions disclosed herein.

Furthermore, in one embodiment, the steering system 156 includes a data store 230. The data store 230 is, in one embodiment, an electronic data structure such as a database that is stored in the memory 220 or another memory and that is configured with routines that can be executed by the processor 200 for analyzing stored data, providing stored data, organizing stored data, and so on. Thus, in one embodiment, the data store 230 stores data used by the assistance module 210 in executing various functions. In one embodiment, the data store 230 includes sensor data 240, along with, for example, other information that is used by the assistance module 210. The sensor data 240 may include some or all of the sensor data 146 shown in FIG. 1 and described later in this disclosure.

The assistance module 210 generally includes instructions that function to control the processor 200 to acquire sensor data 240. The processor 200 can acquire the sensor data 240 from the sensor system 104. The sensor data 240 can include the sensor data 146 of FIG. 1 discussed in further detail below. In one embodiment, the assistance module 210 controls the radar sensor(s) 112 and the camera(s) 118 of the vehicle 100 to observe the surrounding environment. Alternatively, or additionally, the assistance module 210 controls the camera(s) 118 and the LIDAR sensor(s) 114 or another set of sensors to acquire the sensor data 240. As part of controlling the sensors to acquire the sensor data 240, it is generally understood that the sensors acquire the sensor data 240 of a region around the vehicle 100 with data acquired from different types of sensors generally overlapping in order to provide for a comprehensive sampling of the surrounding environment at each time step. In general, the sensor data 240 need not be of the exact same bounded region in the surrounding environment but should include a sufficient area of overlap such that distinct aspects of the area can be correlated. Thus, the assistance module 210, in one embodiment, controls the sensors to acquire the sensor data 240 of the surrounding environment.

Moreover, in further embodiments, the assistance module 210 controls the sensors to acquire the sensor data 240 at successive iterations or time steps. Thus, the steering system 156, in one embodiment, iteratively executes the functions to acquire the sensor data 240 and provide information therefrom. Furthermore, the assistance module 210, in one embodiment, executes one or more of the noted functions in parallel for separate observations in order to maintain updated perceptions. Additionally, as previously noted, the assistance module 210, when acquiring data from multiple sensors, fuses the data together to form the sensor data 240 and to provide for improved determinations of detection, location, and so on.

The sensor data 240 can include information about operation of the vehicle 100 itself, including the speed of the vehicle 100, the acceleration of the vehicle 100, etc. The sensor data 240 can also include information about one or more tires of the vehicle 100. The tires 310 can include a first front tire and a second front tire that form a pair of front tires. The tires can also include a first rear tire and a second rear tire. In some instances, the pair of front tires may be controlled by the steering wheel while the rear tires are not controlled by the steering wheel. The sensor data 240 can include information about the friction between the tires and the road upon which the vehicle 100 is traveling and/or the rate of rotation of the tires. The sensor data 240 can also include information about the environment in which the vehicle 100 is traveling. For example, the sensor data 240 can include information about the road, including the boundaries of the road, the type of surface of the road, etc.

The assistance module 210 also includes instructions that function to control the processor 200 to detect a slipping tire of the vehicle 100 losing traction with the road. Using the sensor data 240, the assistance module 210 can detect the friction between the slipping tire and the road transitioning from rolling friction to slipping friction. In other words, the assistance module 210 can detect a change from the slipping tire rolling on the road to slipping on the road.

The assistance module 210 can detect this change. For example, the sensor data 240 may include data from one or more tire rotation sensors of the vehicle 100, and the assistance module 210 can detect the change in friction using rate of rotation of the tires. For example, if the rate of rotation of the slipping tire decreases significantly while the vehicle 100 is still traveling or increases significantly while the vehicle 100 is still traveling, this may indicate loss of traction as the tire loses grip with the road and transitions into a reduced friction state. In another example, the sensor data 240 may include data from one or more accelerometers of the vehicle 100, and the assistance module 210 can detect a change in acceleration of the vehicle 100, which may indicate, for example, side slip.

The assistance module 210 also includes instructions that function to control the processor 200 to decouple control of the pair of front tires by the steering wheel. The assistance module 210 decouples control of the pair of front tires by the steering wheel upon detecting the loss of traction of the slipping tire. In some instances, decoupling control of the pair of front tires by the steering wheel involves decoupling the electrical connection between the pair of front tires and the steering wheel in a steer-by-wire system 124 of the vehicle 100 or otherwise ignoring an input to the steering wheel by the driver. The steer-by-wire system 124 will be discussed in further detail below in connection with FIG. 5.

The assistance module 210 also includes instructions that function to control the processor 200 to, in response to detecting the slipping tire losing traction with the road, automatically steer the vehicle 100 separately from an input of the steering wheel to cause the vehicle 100 to follow a path. In one embodiment, the path is the road itself, and the assistance module 210 steers the vehicle 100 to cause the vehicle 100 to follow the road. In another embodiment, the path is a lane in which the vehicle 100 is traveling, and the assistance module 210 steers the vehicle 100 to cause the vehicle 100 to follow the road. In yet another embodiment, the path is a path following a safety envelope of the vehicle 100. A safety envelope may be defined as a zone within which the vehicle 100 may travel safely as the vehicle 100 travels along its trajectory. The safety envelope may have a left boundary that is distanced from and on the left side of the vehicle 100 and a right boundary that is distanced from and on the right side of the vehicle 100. However, the safety envelope may also be forward and rearward of the vehicle 100. In some examples, the safety envelope is dynamic and changes in shape based on the curvature of the path that the vehicle 100 is traveling on, an obstacle along or proximate to the path, the speed of the vehicle 100, the type of object located near the vehicle 100, and so on. In some examples, the safety envelope is a geometrical envelope based on geometrical boundaries of the movement trajectory of the vehicle 100.

In one approach, the assistance module 210 is configured to determine the safety envelope based on the sensor data 146, including the information about the vehicle 100 and/or the information about the external environment. In one example, the assistance module 210 determines the boundaries of the safety envelope based on a predetermined distance from the vehicle 100 and/or the characteristics of the environment. In this example, the assistance module 210 determines that the right boundary is three meters from the right side of the vehicle 100 and the left boundary is two meters from the left side of the vehicle 100. In another example, the assistance module 210 determines the boundaries of the safety envelope based on road markings, sidewalks, and/or other visible road edges such as a fence, grass, or trees. In one approach, the assistance module 210 receives information about an obstacle on the road within the determined boundary of the safety envelope from the sensor data 146 and may adjust the boundary towards the vehicle 100 to exclude the obstacle from the safety envelope. In some arrangements, the assistance module 210 periodically updates the safety envelope as the processor 200 receives more information about the external environment and obstacles in the external environment. The assistance module 210 may use a suitable algorithm, such as a machine learning algorithm or an artificial intelligence process to determine a safety envelope and its boundaries.

To cause the vehicle 100 to follow the path, the processor 200 may steer the vehicle 100 by rotating the pair of front tires. In some instances, though, in order to cause the vehicle 100 to follow the path, the processor 200 may need to rotate the pair of front tires in a direction that is not directly proportional to the steering wheel angle. This may occur when oversteering, understeering, or countersteering are needed to achieve the intended yaw during loss of traction.

Oversteering includes rotating the pair of front tires more than would be required to achieve the intended yaw when there is no loss of traction. Oversteering may be required when one of the rear tires loses traction before one of the front tires can occur during acceleration of the vehicle 100, because of a sudden weight transfer within the vehicle 100, sudden braking of the vehicle 100, or any during any other event in which one or more of the tires loses traction. Understeering includes rotating the pair of front tires less than would be required to achieve the intended yaw when there is no loss of traction. Understeering may be required when one of the front tires loses traction before one of the rear tires and can occur during tight turns or during any other event in which one or more of the tires loses traction. Countersteering (also called opposite lock) includes rotating the pair of front tires in a direction opposite the intended yaw direction. Countersteering may be required when the vehicle 100 is skidding or during any other event in which one or more of the tires loses traction. In some instances, the processor 200 may need to countersteer the vehicle 100 in a direction opposite the intended yaw direction in order to achieve the intended yaw. In any case, the assistance module 210 may steer the vehicle 100 to cause the slipping tire to regain traction with the road. In other words, the processor 200 may steer the vehicle to cause the friction between the slipping tire and the road to transition from slipping friction back to rolling friction.

In some instances, when the assistance module 210 takes control of the steering of the vehicle 100, the driver may not intuitively understand the intent of the steering system 156. For example, the driver may not understand the intent of the steering system 156 if the steering system 156 locked the steering wheel when taking control of the steering of the vehicle 100 or allowed free rotation of the steering wheel when taking control of the steering of the vehicle 100. In either of these examples, the driver may try to regain control of the vehicle 100, which can lead to dangerous situations.

Accordingly, the assistance module 210 also includes instructions that function to control the processor 200 to rotate, independently of an input to the steering wheel and in parallel with steering the vehicle 100, the steering wheel to match an actual yaw of the vehicle 100. In some instances, the actual yaw includes the direction in which the vehicle 100 is traveling (e.g., the heading of the vehicle 100). Additionally or alternatively, the actual yaw includes the rate of rotation (e.g., the change in yaw) of the vehicle 100. Rotating the steering wheel to match the actual yaw may allow the driver to feel like they are still in control of the steering of the vehicle 100 or may otherwise allow the driver to intuitively understand the direction in which the steering system 156 is steering the vehicle 100. The assistance module 210 can perform the functions of steering the vehicle 100 independently of an input to the steering wheel and rotating the steering wheel to match the actual yaw of the vehicle 100 substantially in parallel. In some instances, the assistance module 210 can rotate the steering wheel in a direction that is not proportional to the direction of the pair of front tires. In some instances, the assistance module 210 can rotate the steering wheel according to an Ackerman steering model, which assumes none of the tires have lost traction.

The assistance module 210 also includes instructions that function to control the processor 200 to, responsive to detecting the slipping tire regaining traction with the road, align the steering wheel with the slipping tire by rotating the steering wheel to cause the angle of the steering wheel to correlate to the angle of the pair of front tires and the actual yaw. This may be done so that the angle of the steering wheel, the angle of the pair of front tires, and the actual yaw are all proportional to each other according to the mental model of the driver. In doing so, the driver can regain control of the vehicle 100 in a normal manner.

Figure 3A:
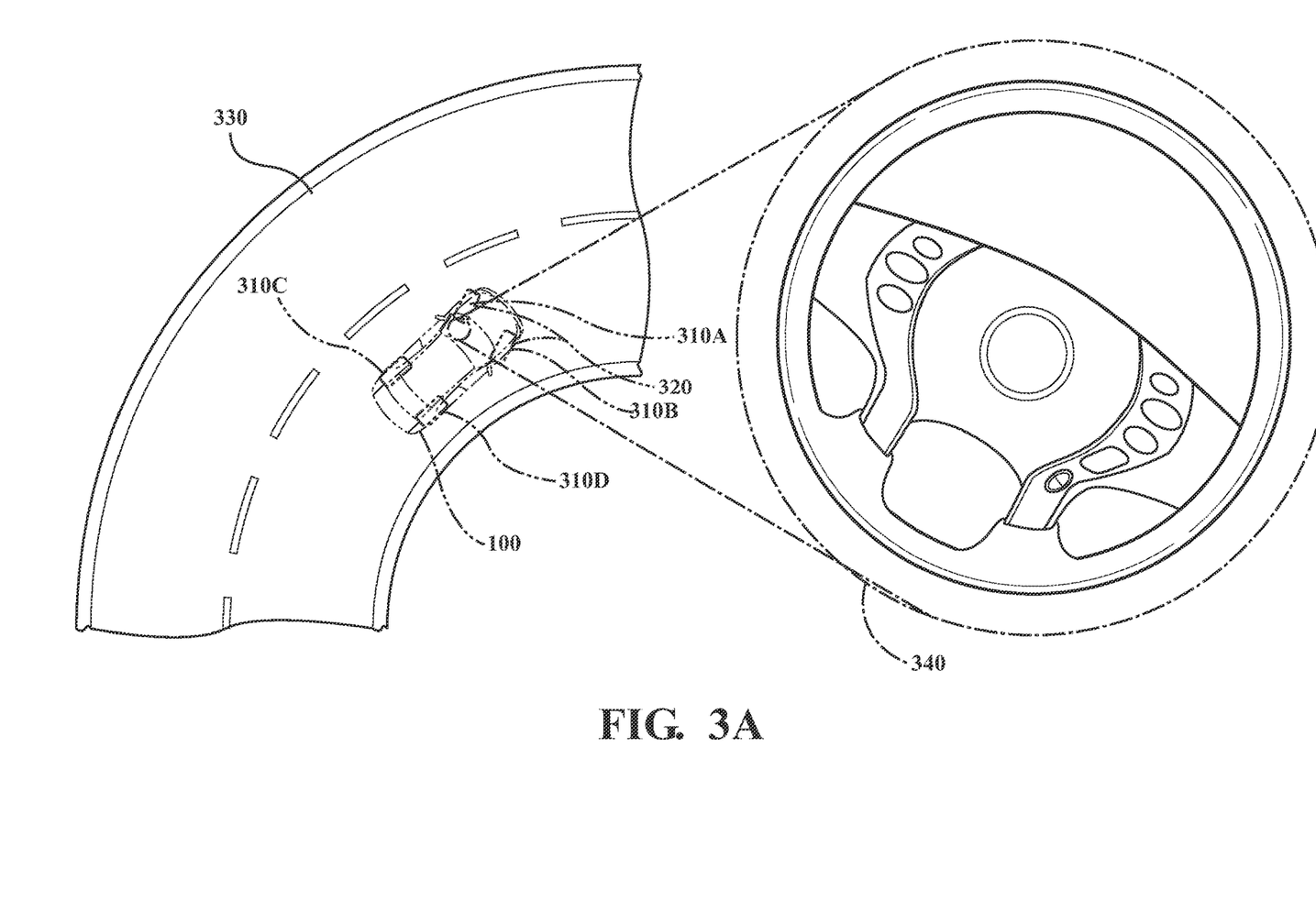
FIG. 3A illustrates an example of automatically operating the steering system when the vehicle is turning right.
Figure 3B:
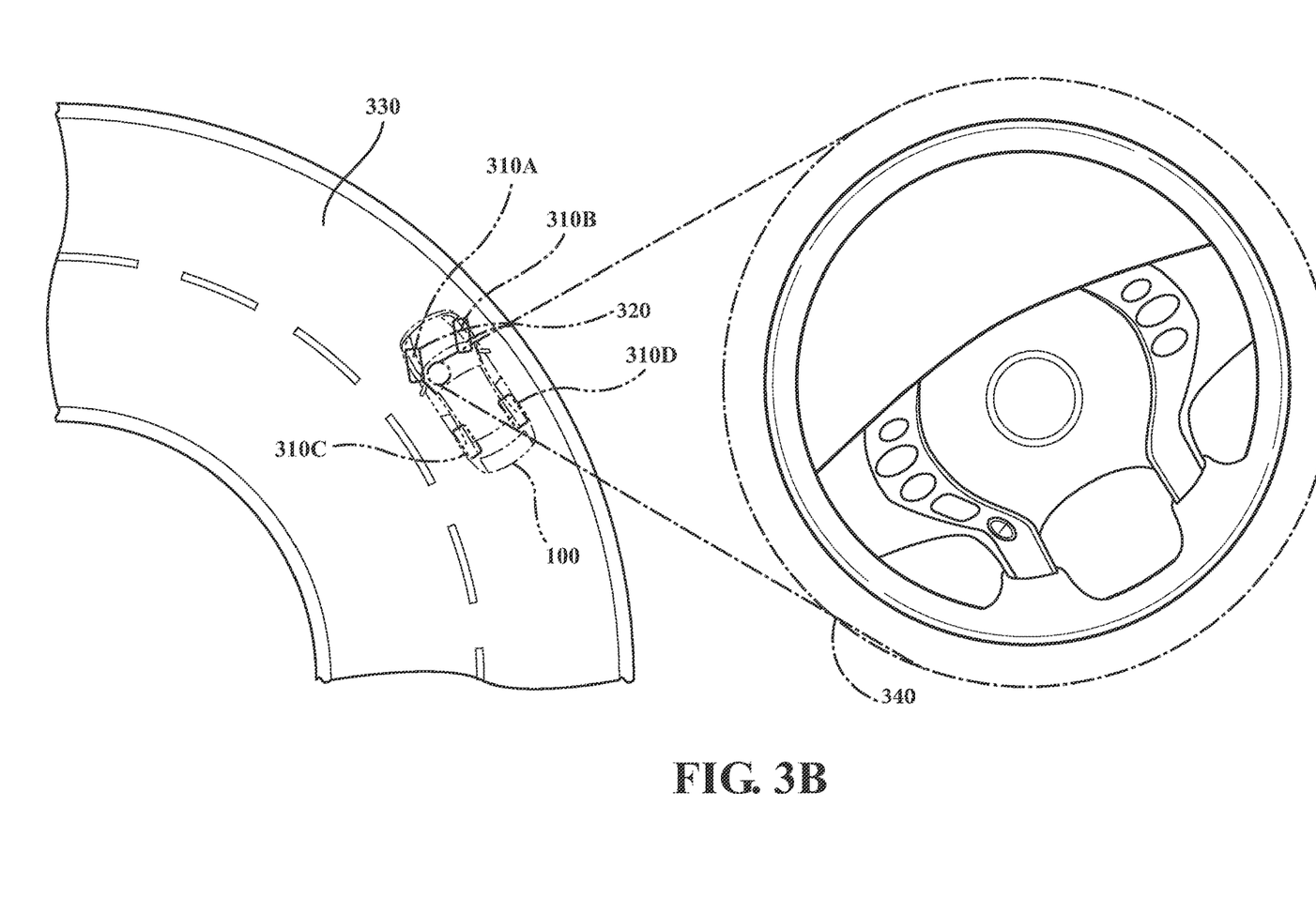
FIG. 3B illustrates an example of automatically operating the steering system when the vehicle is turning left.

Illustrated examples of operating the steering system 156 are shown in FIGS. 3A and 3B. As shown, the vehicle 100 can include four tires 310. The tires 310 include a first front tire 310A and a second front tire 310B. The first front tire 310A and the second front tire 310B form a pair of front tires 320. The tires 310 also include a first rear tire 310C and a second rear tire 310D. The slipping tire can be any of the tires 310. For example, the slipping tire can be the first rear tire 310C. The vehicle 100 can also include a steering wheel 340.

Referring to FIG. 3A, a driver of the vehicle 100 may be steering the vehicle 100 through a right turn in a road 330. During the right turn, the slipping tire may lose traction with the road 330. The assistance module 210 is configured to identify a path of the road 330. For example, in FIG. 3A, the path is the lane in which the vehicle 100 is traveling. In order to cause the vehicle 100 to follow the path, however, the assistance module 210 may need to automatically countersteer the vehicle 100 by rotating the pair of front tires 320 to the left in order to accomplish the right turn. While rotating the pair of front tires 320 to the left, the assistance module 210 can also, independently of an input by the driver to the steering wheel 340, rotate the steering wheel clockwise to match the actual yaw of the vehicle 100 as the steering system 156 steers the vehicle 100 through the right turn.

Referring to FIG. 3B, a driver of the vehicle 100 may be steering the vehicle 100 through a left turn in the road 330. During the left turn, the slipping tire may lose traction with the road 330. The assistance module 210 is configured to identify a path of the road 330. For example, in FIG. 3B, the path is the lane in which the vehicle 100 is traveling. In order to achieve the intended counterclockwise yaw, however, the assistance module 210 may need to countersteer the vehicle 100 by rotating the pair of front tires 320 to the right in order to accomplish the left turn. While rotating the pair of front tires 320 to the right, the assistance module 210 can also, independently of an input by the driver to the steering wheel 340, rotate the steering wheel 340 counterclockwise to match the actual yaw of the vehicle 100 as the steering system 156 steers the vehicle 100 through the left turn.

Figure 4:
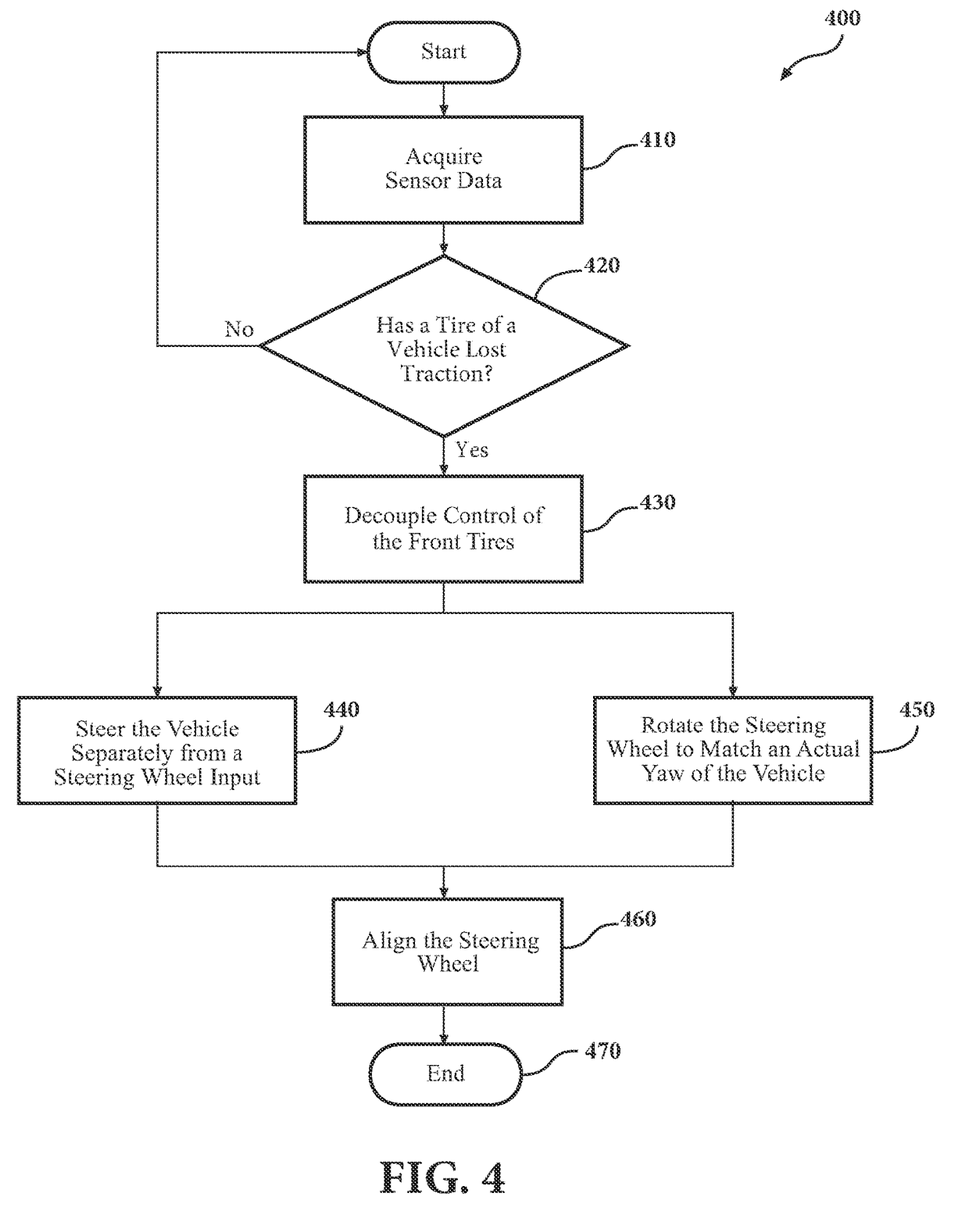
FIG. 4 illustrates an example of a method of automatically operating the steering system.

Referring to FIG. 4, a flowchart illustrating a method 400 for controlling a vehicle is shown. The method 400 will be described from the viewpoint of the vehicle 100 of FIG. 1 and the steering system 156 of FIG. 2. However, it should be understood that this is just one example of implementing the method 400. While method 400 is discussed in combination with the steering system 156, it should be appreciated that the method 400 is not limited to being implemented within the steering system 156 but is instead one example of a system that may implement the method 400.

The method 400 begins. At 410, in one approach, the assistance module 210 acquires sensor data 240. In some examples, the sensor data 240 includes information about operation of the vehicle 100 itself, including the speed of the vehicle 100, the acceleration of the vehicle 100, etc. The sensor data 240 can also include information about one or more tires of the vehicle 100. The tires 310 include a first front tire 310A and a second front tire 310B that form a pair of front tires 320. The tires 310 also include a first rear tire 310C and a second rear tire 310D. In some instances, the pair of front tires 320 is controlled by the steering wheel 340 while the rear tires 310C and 310D are statically mounted in regard to a longitudinal direction of the vehicle 100. In some instances, the sensor data 240 includes information about the friction between the tires 310 and the road 330 upon which the vehicle 100 is traveling and/or the rate of rotation of the tires 310. The sensor data 240 can also include information about the environment in which the vehicle 100 is traveling. For example, the sensor data 240 includes information about the road 330, including the boundaries of the road 330, the type of surface of the road 330, etc.

At 420, in one approach, the assistance module 210 detects a slipping tire of the vehicle 100 losing traction with the road 330. For example, the method 400 includes detecting a tire 310 losing traction with the road 330 using the sensor data 240. Using the sensor data 240, in one approach, the assistance module 210 detects the friction between the slipping tire and the road 330 transitioning from rolling friction to slipping friction. In other words, the assistance module 210 detects a change from the slipping tire rolling on the road to slipping on the road. If no loss of traction is detected, the method 400 returns to the start.

The assistance module 210 detects the change from rolling friction to slipping frictions in a suitable manner. In one approach, the sensor data 240 includes data from one or more tire rotation sensors of the vehicle 100, and the assistance module 210 detects the change in friction using rate of rotation of the tires 310. In one example, the assistance module 210 detects a slipping tire when the rate of rotation of one of the tires 310 decreases significantly while the vehicle 100 is still traveling or increases significantly while the vehicle 100 is still traveling. In another example, the sensor data 240 includes data from one or more accelerometers of the vehicle 100, and the assistance module 210 detects a change in acceleration of the vehicle 100, which may indicate, for example, side slip.

At 430, in one approach, the assistance module 210 decouples control of the pair of front tires 320 by the steering wheel 340. In one approach, the assistance module 210 decouples control of the pair of front tires 320 by the steering wheel 340 upon detecting the loss of traction of the slipping tire. In some instances, decoupling control of the pair of front tires 320 by the steering wheel 340 involves decoupling the electrical connection between the pair of front tires 320 and the steering wheel 340 in a steer-by-wire system 124 of the vehicle 100 or otherwise ignoring an input to the steering wheel 340 by the driver.

At 440, in one approach, the assistance module 210 automatically steers the vehicle 100 separately from an input to the steering wheel 340 to cause the vehicle 100 to follow a path. As mentioned above, in one embodiment, the path is the road 330 itself, and the assistance module 210 steers the vehicle 100 to cause the vehicle 100 to follow the road 330. In another embodiment, the path is a lane in the road 330 in which the vehicle 100 is traveling, and the assistance module 210 steers the vehicle 100 to cause the vehicle 100 to follow the lane. In yet another embodiment, the path is a path following a safety envelope of the vehicle 100, and the assistance module 210 steers the vehicle 100 to cause the vehicle 100 to follow the safety envelope.

In one approach, the assistance module 210 is configured to determine the safety envelope based on the sensor data 146, including the information about the vehicle 100 and/or the information about the external environment. For example, the assistance module 210 determines the boundaries of the safety envelope based on a predetermined distance from the vehicle 100 and/or the characteristics of the environment. In this example, the assistance module 210 determines that the right boundary is three meters from the right side of the vehicle 100 and the left boundary is two meters from the left side of the vehicle 100. In another example, the assistance module 210 determines the boundaries of the safety envelope based on road markings, sidewalks, and/or other visible road edges such as a fence, grass, or trees. In one approach, the assistance module 210 receives information about an obstacle on the road 330 within the determined boundary of the safety envelope from the sensor data 146 and may adjust the boundary towards the vehicle 100 to exclude the obstacle from the safety envelope. In some instances, the assistance module 210 periodically updates the safety envelope as the processor 200 receives more information about the external environment and obstacles in the external environment. The assistance module 210 may use a suitable algorithm, such as a machine learning algorithm or an artificial intelligence process to determine a safety envelope and its boundaries.

In some instances and as described above, in order to cause the vehicle to follow the path, the assistance module 210 may need to rotate the pair of front tires 320 in a direction that is not directly proportional to the steering wheel angle 340. As described in further detail above, this may occur when oversteering, understeering, or countersteering are needed to achieve the intended yaw during loss of traction.

At 450, in one approach, the assistance module 210 rotates the steering wheel 340 to match an actual yaw of the vehicle 100. Rotating the steering wheel 340 to match the actual yaw may allow the driver to feel like they are still in control of the steering of the vehicle 100 or may otherwise allow the driver to intuitively understand the direction in which the steering system 156 is steering the vehicle 100. In some instances, the assistance module 210 rotates the steering wheel 340 in a direction that is not proportional to the angle of the pair of front tires 320. In some instances, the assistance module 210 rotates the steering wheel 340 according to an Ackerman steering model, which assumes none of the tires 310 have lost traction.

At 460, in one approach, the assistance module 210 aligns, responsive to detecting the slipping tire regaining traction with the road 330, the steering wheel 340 with the slipping tire by rotating the steering wheel 340 to cause the angle of the steering wheel 340 to correlate to the angle of the pair of front tires 320 and the actual yaw. Aligning the steering wheel 340 with the slipping tire may be done so that the angle of the steering wheel 340, the angle of the pair of front tires 320, and the actual yaw are all proportional to each other according to the mental model of the driver. In doing so, the driver can regain control of the vehicle 100 in a normal manner. The method 400 may end at 470 when the assistance module 210 determines that the steering wheel 340 is aligned with the slipping tire.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the steering system 156 to ensure the vehicle 100 remains within defined state constraints.

The vehicle 100 can include one or more processor(s) 102. In one or more arrangements, the processor(s) 102 can be a main processor of the vehicle 100. For instance, the processor(s) 102 can be an electronic control unit (ECU). The vehicle 100 can include one or more data stores(s) 138 for storing one or more types of data. The data stores(s) 138 can include volatile and/or non-volatile memory. Examples of suitable data stores 138 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data stores(s) 138 can be a component of the processor(s) 102, or the data stores(s) 138 can be operatively connected to the processor(s) 102 for use thereby. The term "operatively connected," as used throughout this description, can include direct or indirect connections, including connections without direct physical contact.

In one or more arrangements, the data stores(s) 138 can include map data 140. The map data 140 can include maps of one or more geographic areas. In some instances, the map data 140 can include information or data on roads, traffic control devices, road markings, structures, features, and/or landmarks in the one or more geographic areas. The map data 140 can be in any suitable form. In some instances, the map data 140 can include aerial views of an area. In some instances, the map data 140 can include ground views of an area, including 360-degree ground views. The map data 140 can include measurements, dimensions, distances, and/or information for one or more items included in the map data 140 and/or relative to other items included in the map data 140. The map data 140 can include a digital map with information about road geometry. The map data 140 can be high quality and/or highly detailed.

In one or more arrangements, the map data 140 can include one or more terrain maps 142. The terrain map(s) 142 can include information about the ground, terrain, roads, surfaces, and/or other features of one or more geographic areas. The terrain map(s) 142 can include elevation data in the one or more geographic areas. The map data 140 can be high quality and/or highly detailed. The terrain map(s) 142 can define one or more ground surfaces, which can include paved roads, unpaved roads, land, and other things that define a ground surface.

In one or more arrangements, the map data 140 can include one or more static obstacle map(s) 144. The static obstacle map(s) 144 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 144 can have location data, size data, dimension data, material data, and/or other data associated with it. The static obstacle map(s) 144 can include measurements, dimensions, distances, and/or information for one or more static obstacles. The static obstacle map(s) 144 can be high quality and/or highly detailed. The static obstacle map(s) 144 can be updated to reflect changes within a mapped area.

The data stores(s) 138 can also include sensor data 146. In this context, "sensor data" means any information about the sensors that the vehicle 100 is equipped with, including the capabilities and other information about such sensors. As will be explained below, the vehicle 100 can include the sensor system 104. The sensor data 146 can relate to one or more sensors of the sensor system 104. As an example, in one or more arrangements, the sensor data 146 can include information on one or more LIDAR sensors 114 of the sensor system 104.

In some instances, at least a portion of the map data 140 and/or the sensor data 146 can be located in one or more data stores 138 located onboard the vehicle 100. Alternatively, or in addition, at least a portion of the map data 140 and/or the sensor data 146 can be located in one or more data stores 138 that are located remotely from the vehicle 100.

As noted above, the vehicle 100 can include the sensor system 104. The sensor system 104 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 104 includes a plurality of sensors, the sensors can work independently from each other. Alternatively, two or more of the sensors can work in combination with each other. In such a case, the two or more sensors can form a sensor network. The sensor system 104 and/or the one or more sensors can be operatively connected to the processor(s) 102, the data stores(s) 138, and/or another element of the vehicle 100 (including any of the elements shown in FIG. 1). The sensor system 104 can acquire data of at least a portion of the external environment of the vehicle 100 (e.g., nearby vehicles).

The sensor system 104 can include any suitable type of sensor. Various examples of different types of sensors will be described herein. However, it will be understood that the embodiments are not limited to the particular sensors described. The sensor system 104 can include one or more vehicle sensor(s) 106. The vehicle sensor(s) 106 can detect, determine, and/or sense information about the vehicle 100 itself. In one or more arrangements, the vehicle sensor(s) 106 can be configured to detect, and/or sense position and orientation changes of the vehicle 100, such as, for example, based on inertial acceleration. In one or more arrangements, the vehicle sensor(s) 106 can include one or more accelerometers, one or more gyroscopes, an inertial measurement unit (IMU), a dead-reckoning system, a global navigation satellite system (GNSS), a global positioning system (GPS), a navigation system 136, and/or other suitable sensors. The vehicle sensor(s) 106 can be configured to detect, and/or sense one or more characteristics of the vehicle 100. In one or more arrangements, the vehicle sensor(s) 106 can include a speedometer to determine a current speed of the vehicle 100. The vehicle sensor(s) 106 can also include one or more steering wheel sensors 108. The steering wheel sensor(s) 108 can detect information about the steering wheel 340 of the vehicle 100. For example, the steering wheel sensor(s) 108 can determine the angle of the steering wheel 340.

Alternatively, or in addition, the sensor system 104 can include one or more environment sensor(s) 110 configured to acquire, and/or sense driving environment data. "Driving environment data" includes data or information about the external environment in which an autonomous vehicle is located or one or more portions thereof. For example, the environment sensor(s) 110 can be configured to detect, quantify and/or sense obstacles in at least a portion of the external environment of the vehicle 100 and/or information/data about such obstacles. Such obstacles may be stationary objects and/or dynamic objects. The environment sensor(s) 110 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 104 will be described herein. The example sensors may be part of the environment sensor(s) 110 and/or the vehicle sensor(s) 106. However, it will be understood that the embodiments are not limited to the particular sensors described. As an example, in one or more arrangements, the sensor system 104 can include one or more radar sensor(s) 112, one or more LIDAR sensor(s) 114, one or more sonar sensor(s) 116, and/or one or more camera(s) 118. In one or more arrangements, the camera(s) 118 can be high dynamic range (HDR) camera(s) or infrared (IR) camera(s).

The vehicle 100 can include an input system 148. An "input system" includes any device, component, system, element or arrangement or groups thereof that enable information/data to be entered into a machine. The input system 148 can receive an input from a vehicle passenger (e.g., a driver or a passenger). The vehicle 100 can include an output system 150. An "output system" includes any device, component, or arrangement or groups thereof that enable information/data to be presented to a vehicle passenger (e.g., a person, a vehicle passenger, etc.).

The vehicle 100 can include one or more vehicle systems 120. Various examples of the vehicle system(s) 120 are shown in FIG. 1. However, the vehicle 100 can include more, fewer, or different vehicle system(s) 120. It should be appreciated that although particular vehicle systems are separately defined, each or any of the systems or portions thereof may be otherwise combined or segregated via hardware and/or software within the vehicle 100. The vehicle 100 can include a propulsion system 122, a steer-by-wire system 124, a braking system 128, a throttle system 130, a transmission system 132, a signaling system 134, and/or a navigation system 136. Each of these systems can include one or more devices, components, and/or a combination thereof, now known or later developed.

Figure 5:
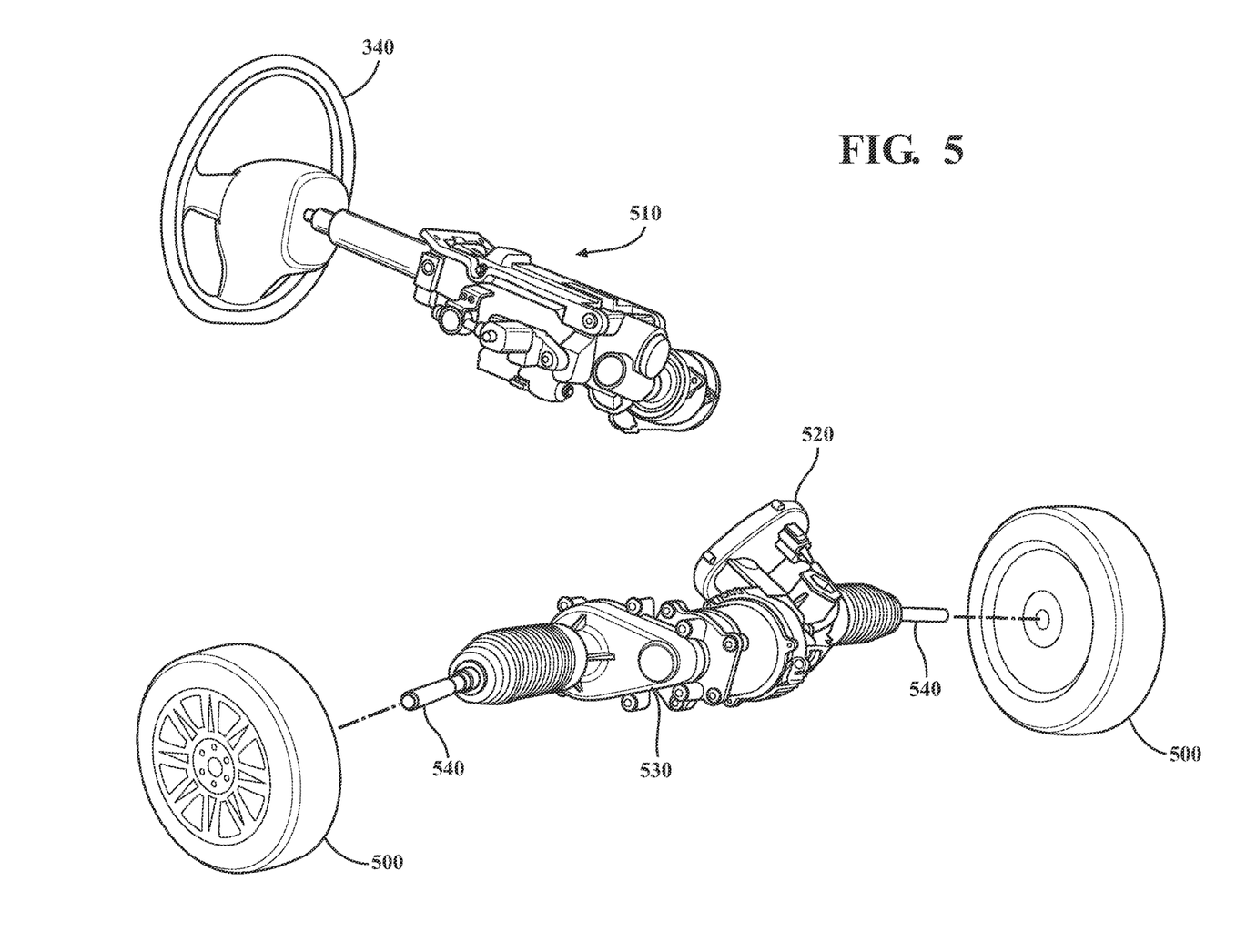
FIG. 5 illustrates an example of a steer-by-wire system of the vehicle that may be used in connection with the steering system.

With additional reference to FIG. 5, the steer-by-wire system 124 is operable to perform one or more steering functions, including but not limited to steering the vehicle 100. Among the elements of the steer-by-wire system 124, the vehicle 100 includes a user-operated steering wheel 340 on the dash assembly or otherwise housed in the passenger compartment, a steering mechanism at one, some, or all of the wheels 500, and a torque feedback unit 126 (FIG. 1) at the steering wheel 340. The steering mechanism is mechanically connected to the wheels 500. The wheels 500 have an adjustable steering angle, and the steering mechanism is operable to adjust the steering angle. As a product of adjusting the steering angle, the steering mechanism is operable to steer the vehicle 100 as it drives along the ground. The torque feedback unit 126 is mechanically connected to the steering wheel 340. The torque feedback unit 126 is operable to apply torque to the steering wheel 340.

The steering wheel 340 can be a conventional steering wheel typical of a traditional mechanically coupled steering system. The steer-by-wire system 124 uses electrical or electro-mechanical steering elements for performing steering functions that are traditionally achieved in a mechanically coupled steering system by mechanical linkages, including but not limited to, by the operation of the steering mechanism, adjusting the steering angle in response to user operation of the steering wheel 340, and, by the operation of the torque feedback unit 126, applying torque to the steering wheel 340 for haptically simulating steering feel through the steering wheel 340.

As part of the steering mechanism, the steer-by-wire system 124 includes a steering actuator 510, a pinion 520, a rack 530, and tie-rods 540. The pinion 520, the rack 530, and the tie-rods 540 are mechanically connected to the wheels 500. The pinion 520, the rack 530, and the tie-rods 540 can be conventional steering elements configured to adjust the steering angle by rotating the pinion 520. The steering actuator 510 is mechanically connected to the pinion 520. The steering actuator 510 includes an electric motor operable to rotate the pinion 520. By the operation of the electric motor, as a product of rotating the pinion 520, the steering actuator 510 is operable to change the steering angle mechanically independently of an input to the steering wheel 340. The torque feedback unit 126 includes an electric motor operable to apply torque to the steering wheel 340. By operation of the electric motor, the torque feedback unit 126 is operable to apply torque to the steering wheel 340 for haptically simulating steering feel through the steering wheel 340. Without application of the torque to haptically simulate steering feel, the steering wheel 340 would freely turn and the user would not experience haptic resistance and/or haptic feedback through the steering wheel 340 typical of mechanically coupled steering systems.

Referring back to FIG. 1, the navigation system 136 can include one or more devices, applications, and/or combinations thereof, now known or later developed, configured to determine the geographic location of the vehicle 100 and/or to determine a travel route for the vehicle 100. The navigation system 136 can include one or more mapping applications to determine a travel route for the vehicle 100. The navigation system 136 can include a global positioning system, a local positioning system or a geolocation system.

The processor(s) 102, the steering system 156, and/or the automated driving system 154 can be operatively connected to communicate with the various vehicle systems 120 and/or individual components thereof. For example, returning to FIG. 1, the processor(s) 102 and/or the automated driving system 154 can be in communication to send and/or receive information from the various vehicle systems 120 to control the movement, speed, maneuvering, heading, direction, etc. of the vehicle 100. The processor(s) 102, the steering system 156, and/or the automated driving system 154 may control some or all of these vehicle systems 120 and, thus, may be partially or fully autonomous.

The processor(s) 102, the steering system 156, and/or the automated driving system 154 can be operatively connected to communicate with the various vehicle systems 120 and/or individual components thereof. For example, returning to FIG. 1, the processor(s) 102, the steering system 156, and/or the automated driving system 154 can be in communication to send and/or receive information from the various vehicle systems 120 to control the movement, speed, maneuvering, heading, direction, etc. of the vehicle 100. The processor(s) 102, the steering system 156, and/or the automated driving system 154 may control some or all of these vehicle systems 120.

The processor(s) 102, the steering system 156, and/or the automated driving system 154 may be operable to control the navigation and/or maneuvering of the vehicle 100 by controlling one or more of the vehicle systems 120 and/or components thereof. For instance, when operating in an autonomous mode, the processor(s) 102, the steering system 156, and/or the automated driving system 154 can control the direction and/or speed of the vehicle 100. The processor(s) 102, the steering system 156, and/or the automated driving system 154 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 152. The actuator(s) 152 can be any element or combination of elements operable to modify, adjust and/or alter one or more of the vehicle systems 120 or components thereof to responsive to receiving signals or other inputs from the processor(s) 102 and/or the automated driving system 154. Any suitable actuator can be used. For instance, the one or more actuators 152 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor, implement one or more of the various processes described herein. One or more of the modules can be a component of the processor(s) 102, or one or more of the modules can be executed on and/or distributed among other processing systems to which the processor(s) 102 is operatively connected. The modules can include instructions (e.g., program logic) executable by one or more processor(s) 102. Alternatively, or in addition, the data store(s) 138 may contain such instructions. The module(s) can include the assistance module 210.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an automated driving system 154. The automated driving system 154 can be configured to receive data from the sensor system 104 and/or any other type of system capable of capturing information relating to the vehicle 100 and/or the external environment of the vehicle 100. In one or more arrangements, the automated driving system 154 can use such data to generate one or more driving scene models. The automated driving system 154 can determine position and velocity of the vehicle 100. The automated driving system 154 can determine the location of obstacles, obstacles, or other environmental features including traffic signs, trees, shrubs, neighboring vehicles, pedestrians, etc.

The automated driving system 154 can be configured to receive, and/or determine location information for obstacles within the external environment of the vehicle 100 for use by the processor(s) 102, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving system 154 either independently or in combination with the steering system 156 can be configured to determine travel path(s), current autonomous driving maneuvers for the vehicle 100, future autonomous driving maneuvers and/or modifications to current autonomous driving maneuvers based on data acquired by the sensor system 104, driving scene models, and/or data from any other suitable source such as determinations from the sensor data 146 as implemented by the module. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The automated driving system 154 can be configured to implement determined driving maneuvers. The automated driving system 154 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving system 154 can be configured to execute various vehicle functions and/or to transmit data to, receive data from, interact with, and/or control the vehicle 100 or one or more systems thereof (e.g., one or more of vehicle systems 120).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
   a processor; and
   a memory communicably coupled to the processor and storing an assistance module including instructions that when executed by the processor cause the processor to:
   in response to detecting a slipping tire of a vehicle losing traction with a road, steer the vehicle separately from an input of a steering wheel of the vehicle to cause the vehicle to follow a path;
   decouple control of a pair of front tires of the vehicle by the steering wheel; and
   rotate, independently of an input to the steering wheel and in parallel with steering the vehicle, the steering wheel to match an actual yaw of the vehicle.

2. The system of claim 1, wherein the assistance module includes instructions to steer the vehicle by rotating the pair of front tires to cause the vehicle to follow the path, and wherein the assistance module includes instructions to rotate the steering wheel in a different direction than the front tires, such that the angle of the pair of front tires is not proportional to the steering wheel angle.

3. The system of claim 1, wherein the assistance module includes instructions to detect the slipping tire losing traction with the road when the friction between the slipping tire and the road transitions from rolling friction to slipping friction, and wherein the assistance module includes instructions steer the vehicle by at least one of oversteering the vehicle, understeering the vehicle, and countersteering the vehicle to cause the friction between the slipping tire and the road to transition from slipping friction to rolling friction.

4. The system of claim 1, wherein the assistance module includes instructions to steer the vehicle to the right, and wherein the assistance module includes instructions to rotate the steering wheel to match the actual yaw by rotating the steering wheel clockwise.

5. The system of claim 1, wherein the assistance module includes instructions to steer the vehicle to the left, and wherein the assistance module includes instructions to rotate the steering wheel to match the actual yaw by rotating the steering wheel counterclockwise.

6. The system of claim 1, wherein the assistance module includes instructions to rotate the steering wheel to match the actual yaw by rotating the steering wheel according to an Ackerman steering model in which there is no loss of traction.

7. The system of claim 1, wherein the assistance module further includes instructions to:
in response to detecting the slipping tire regaining traction with the road, align the steering wheel with the pair of front tires by rotating the steering wheel to cause an angle of the steering wheel to correlate with an angle of the pair of front tires and the actual yaw.

8. A non-transitory computer-readable medium having instructions that, when executed by a processor, cause the processor to:
in response to detecting a slipping tire of a vehicle losing traction with a road, steer the vehicle separately from an input of a steering wheel of the vehicle to cause the vehicle to follow a path;
decouple control of a pair of front tires of the vehicle by the steering wheel; and
rotate, independently of an input to the steering wheel and in parallel with steering the vehicle, the steering wheel to match an actual yaw of the vehicle.

9. The non-transitory computer-readable medium of claim 8, wherein the instructions cause the processor to steer the vehicle by rotating the pair of front tires to cause the vehicle to follow the path, and wherein the instructions cause the processor to rotate the steering wheel in a different direction than the pair of front tires, such that the angle of the pair of front tires is not proportional to the steering wheel angle.

10. The non-transitory computer-readable medium of claim 8, wherein the instructions cause the processor to detect the slipping tire losing traction with the road when the friction between the slipping tire and the road transitions from rolling friction to slipping friction, and wherein the instructions cause the processor to steer the vehicle by at least one of oversteering the vehicle, understeering the vehicle, and countersteering the vehicle to cause the friction between the slipping tire and the road to transition from slipping friction to rolling friction.

11. The non-transitory computer-readable medium of claim 8, wherein the instructions cause the processor to steer the vehicle to the right, and wherein the instructions cause the processor to rotate the steering wheel to match the actual yaw by rotating the steering wheel clockwise.

12. The non-transitory computer-readable medium of claim 8, wherein the instructions cause the processor to steer the vehicle to the left, and wherein the instructions cause the processor to rotate the steering wheel to match the actual yaw by rotating the steering wheel counterclockwise.

13. The non-transitory computer-readable medium of claim 8, wherein the instructions further cause the processor to:
in response to detecting the slipping tire regaining traction with the road, align the steering wheel with the front tires by rotating the steering wheel to cause an angle of the steering wheel to correlate with an angle of the front tires of the vehicle and the actual yaw.

14. A method comprising:
responsive to detecting a slipping tire of a vehicle losing traction with a road, steering the vehicle separately from an input of a steering wheel of the vehicle to cause the vehicle to follow a path;
decoupling control of a pair of front tires of the vehicle by the steering wheel; and
rotating, independently of an input to the steering wheel and in parallel with steering the vehicle, the steering wheel to match an actual yaw of the vehicle.

15. The method of claim 14, wherein steering the vehicle includes rotating a pair of front tires of the vehicle to cause the vehicle to follow the path, and wherein rotating the steering wheel includes rotating the steering wheel in a different direction than the front tires, such that the angle of the front tires is not proportional to the steering wheel angle.

16. The method of claim 14, wherein detecting the slipping tire losing traction with the road occurs when the friction between the slipping tire and the road transitions from rolling friction to slipping friction, and wherein steering the vehicle includes at least one of oversteering the vehicle, understeering the vehicle, and countersteering the vehicle to cause the friction between the slipping tire and the road to transition from slipping friction to rolling friction.

17. The method of claim 14, wherein steering the vehicle includes steering the vehicle to the right, and wherein rotating the steering wheel to match the actual yaw includes rotating the steering wheel clockwise.

18. The method of claim 14, wherein steering the vehicle includes steering the vehicle to the left, and wherein rotating the steering wheel to match the actual yaw includes rotating the steering wheel counterclockwise.

19. The method of claim 14, wherein rotating the steering wheel to match the actual yaw includes rotating the steering wheel according to an Ackerman steering model in which there is no loss of traction.

20. The method of claim 14, further comprising:
responsive to detecting the slipping tire regaining traction with the road, aligning the steering wheel with the front tires by rotating the steering wheel to cause an angle of the steering wheel to correlate with an angle of the front tires of the vehicle and the actual yaw.

* * * * *